(12) United States Patent
Luo

(10) Patent No.: US 11,997,683 B2
(45) Date of Patent: *May 28, 2024

(54) FLEXIBLE CONTROL INFORMATION REPORTING

(71) Applicant: QUALCOMM Incorporated, San Diego, CA (US)

(72) Inventor: Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/897,924

(22) Filed: Aug. 29, 2022

(65) Prior Publication Data

US 2023/0066730 A1 Mar. 2, 2023

Related U.S. Application Data

(63) Continuation of application No. 16/678,533, filed on Nov. 8, 2019, now Pat. No. 11,432,269, which is a
(Continued)

(51) Int. Cl.
*H04W 24/10* (2009.01)
*H04L 1/1607* (2023.01)
(Continued)

(52) U.S. Cl.
CPC ........... *H04W 72/21* (2023.01); *H04L 1/1685* (2013.01); *H04L 1/1812* (2013.01);
(Continued)

(58) Field of Classification Search
None
See application file for complete search history.

(56) References Cited

U.S. PATENT DOCUMENTS 8,645,785 B2 * 2/2014 Venkataraj ............ H04L 1/1887
714/751
8,971,907 B2 * 3/2015 Frenne ................... H04L 1/0668
455/452.1
(Continued)

FOREIGN PATENT DOCUMENTS

CN 103814541 A 5/2014
CN 104272630 A 1/2015
(Continued)

OTHER PUBLICATIONS

International Preliminary Report on Patentability—PCT/US2017/032441, The International Bureau of WIPO—Geneva, Switzerland, dated Dec. 4, 2018.
(Continued)

*Primary Examiner* — Sithu Ko
(74) *Attorney, Agent, or Firm* — Loza & Loza LLP/QUALCOMM Incorporated

(57) ABSTRACT

Aspects of the present disclosure provide a mechanism for flexible control information reporting within a wireless communication network by mapping a plurality of hybrid automatic repeat request (HARQ) processes to respective locations in a payload format of an uplink control channel. In response to receiving a request to transmit acknowledgment information corresponding to one or more selected HARQ processes, the acknowledgment information corresponding to the one or more selected HARQ processes may be included in the respective locations of the payload of a current uplink control channel based on the mapping. A remaining portion of the payload of the current uplink control channel may be flexibly utilized for other control information.

65 Claims, 11 Drawing Sheets

Related U.S. Application Data continuation of application No. 15/408,296, filed on Jan. 17, 2017, now Pat. No. 10,512,065.

(60) Provisional application No. 62/343,784, filed on May 31, 2016.

(51) Int. Cl.
| | | |
|---|---|---|
| *H04L 1/1812* | (2023.01) | |
| *H04L 1/1822* | (2023.01) | |
| *H04L 1/1829* | (2023.01) | |
| *H04L 5/00* | (2006.01) | |
| *H04W 72/21* | (2023.01) | |

(52) U.S. Cl.
CPC .......... *H04L 1/1822* (2013.01); *H04L 1/1861* (2013.01); *H04L 5/0055* (2013.01)

(56) References Cited

U.S. PATENT DOCUMENTS

| | | | |
|---|---|---|---|
| 9,148,261 B2 | 9/2015 | Noh et al. | |
| 9,246,645 B2 | 1/2016 | Kim et al. | |
| 9,294,230 B2* | 3/2016 | Han | H04W 72/1268 |
| 9,479,297 B2* | 10/2016 | Graumann | H04L 1/1692 |
| 9,504,029 B2* | 11/2016 | Yang | H04L 1/1861 |
| 9,608,790 B2* | 3/2017 | Chae | H04L 1/1621 |
| 9,888,513 B2* | 2/2018 | Lyer | H04W 28/08 |
| 9,949,273 B2 | 4/2018 | Dahlman et al. | |
| 9,949,275 B2 | 4/2018 | Chen et al. | |
| 10,027,539 B2 | 7/2018 | Song et al. | |
| 10,045,339 B2 | 8/2018 | Wei et al. | |
| 10,103,849 B2 | 10/2018 | Park et al. | |
| 10,129,880 B2* | 11/2018 | Larsson | H04W 74/0833 |
| 10,178,655 B2* | 1/2019 | Yang | H04W 72/21 |
| 10,243,702 B2* | 3/2019 | Wang | H04L 1/1861 |
| 10,244,513 B2 | 3/2019 | Liang et al. | |
| 10,263,755 B2 | 4/2019 | Yang et al. | |
| 10,341,000 B2 | 7/2019 | Lee et al. | |
| 10,425,925 B2* | 9/2019 | Takeda | H04L 1/1671 |
| 10,512,065 B2 | 12/2019 | Luo | |
| 10,826,539 B2* | 11/2020 | Xi | H04L 1/1671 |
| 2008/0069035 A1 | 3/2008 | Pinheiro et al. | |
| 2008/0095106 A1* | 4/2008 | Malladi | H04W 74/002 370/329 |
| 2009/0197599 A1 | 8/2009 | Cho et al. | |
| 2010/0272048 A1 | 10/2010 | Pan et al. | |
| 2011/0249601 A1 | 10/2011 | Seo et al. | |
| 2011/0310819 A1 | 12/2011 | Liao | |
| 2011/0310820 A1 | 12/2011 | Liao | |
| 2012/0069802 A1 | 3/2012 | Chen et al. | |
| 2013/0176917 A1 | 7/2013 | Lee et al. | |
| 2013/0242889 A1 | 9/2013 | Khoryaev et al. | |
| 2014/0003452 A1* | 1/2014 | Han | H04L 1/1657 370/474 |
| 2014/0169319 A1 | 6/2014 | Yang et al. | |
| 2014/0185589 A1* | 7/2014 | Baldemair | H04J 11/0033 370/335 |
| 2014/0321418 A1* | 10/2014 | Rinne | H04L 1/1812 370/329 |
| 2015/0103775 A1 | 4/2015 | Zhu et al. | |
| 2015/0249975 A1 | 9/2015 | Yang et al. | |
| 2016/0056940 A1 | 2/2016 | Chae et al. | |
| 2016/0112181 A1 | 4/2016 | Tabet et al. | |
| 2017/0117991 A1 | 4/2017 | Liu et al. | |
| 2017/0347352 A1 | 11/2017 | Luo | |
| 2018/0102892 A1 | 4/2018 | Lunttila et al. | |
| 2018/0205525 A1 | 7/2018 | He et al. | |
| 2019/0141727 A1 | 5/2019 | Si et al. | |
| 2020/0077390 A1 | 3/2020 | Luo | |

FOREIGN PATENT DOCUMENTS

| | | |
|---|---|---|
| CN | 104380645 A | 2/2015 |
| CN | 105187174 A | 12/2015 |
| CN | 105245312 A | 1/2016 |
| EP | 2800292 A1 | 11/2014 |
| WO | 2015050743 | 4/2015 |
| WO | 2016060599 A1 | 4/2016 |

OTHER PUBLICATIONS

International Search Report and Written Opinion—PCT/US2017/032441—ISA/EPO—dated Aug. 1, 2017.

* cited by examiner

FLEXIBLE CONTROL INFORMATION REPORTING

PRIORITY CLAIM

The present application for patent is a Continuation of Non-Provisional application Ser. No. 16/678,533 filed in the U.S. Patent and Trademark Office on Nov. 8, 2019, the entire content of which is incorporated herein by reference as if fully set forth below in its entirety and for all applicable purposes. Non-Provisional application Ser. No. 16/678,533 is a Continuation of Non-Provisional application Ser. No. 15/408,296 filed in the U.S. Patent and Trademark Office on Jan. 17, 2017, the entire content of which is incorporated herein by reference as if fully set forth below in its entirety and for all applicable purposes. Non-Provisional application Ser. No. 15/408,296 claims priority to and the benefit of Provisional Patent Application No. 62/343,784 filed in the U.S. Patent and Trademark Office on May 31, 2016, the entire content of which is incorporated herein by reference as if fully set forth below in its entirety and for all applicable purposes.

TECHNICAL FIELD

The technology discussed below relates generally to wireless communication systems, and more particularly, to uplink control information reporting in wireless communication systems.

INTRODUCTION

Wireless communication networks are widely deployed to provide various communication services such as telephony, video, data, messaging, broadcasts, and so on. Such networks, which are usually multiple access networks, support communications for multiple users by sharing the available network resources.

As the demand for higher data rates and improved reliability increases, wireless network operators continue to develop mechanisms to maximize throughput and minimize the delay. One such mechanism is the Hybrid Automatic Repeat Request (HARQ) process, which may combine both Forward Error Correction (FEC) and Automatic Repeat Request (ARQ) to correct errors in received packets. FEC adds redundancy (parity bits) to the transmitted data to enable a certain amount of erroneously received bits to be corrected at the receiver. If a packet arrives having a higher number of errors than can be corrected using FEC, the ARQ process is initiated to request a retransmission of the packet from the sender.

In general, HARQ uses a stop and wait (SAW) protocol, in which a transmitting entity waits to receive an acknowledged (ACK) or not acknowledged (NACK) back from the receiving entity before transmitting another packet or retransmitting the same packet. To fully utilize the bandwidth and increase throughput, multiple parallel HARQ processes may be initiated offset in time from one another. Each HARQ process is identified by a unique HARQ process identifier (ID).

On the uplink, HARQ process IDs are typically assigned synchronously, such that each HARQ process is assigned to a specific subframe in sequential order. Thus, when a packet is received corresponding to a specific HARQ process, the ACK/NACK for that packet may be transmitted on an uplink control channel within the subframe assigned to that HARQ process. However, in next generation (5G) networks, flexibility in subframe structures and uplink control information reporting may be needed to meet the stringent data speed and latency requirements.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the disclosure relate to mechanisms for flexible control information reporting within a wireless communication network. A plurality of hybrid automatic repeat request (HARQ) processes may be mapped to respective locations in a payload format of an uplink control channel. In response to receiving a request to transmit acknowledgment information corresponding to one or more selected HARQ processes, the acknowledgment information corresponding to the one or more selected HARQ processes may be included in the respective locations of the payload of a current uplink control channel based on the mapping. A remaining portion of the payload of the current uplink control channel may be flexibly utilized for other control information.

In one aspect, a method of providing uplink control information in a wireless communication network is disclosed. The method includes mapping a plurality of hybrid automatic repeat request (HARQ) processes to a plurality of segments of an uplink control channel, in which each of the segments is mapped to one of the HARQ processes. The method further includes receiving a downlink control channel comprising a request from a scheduling entity to transmit acknowledgment information corresponding to one or more selected segments of the plurality of segments on the uplink control channel, and transmitting the uplink control channel comprising the acknowledgment information corresponding to the one or more selected segments.

Another aspect of the disclosure provides a scheduled entity in a wireless communication network. The scheduled entity includes a transceiver for wireless communication with a scheduling entity, a memory, and a processor communicatively coupled to the transceiver and the memory. The processor is configured to map a plurality of hybrid automatic repeat request (HARQ) processes to a plurality of segments of an uplink control channel, in which each of the segments is mapped to one of the HARQ processes. The processor is further configured to receive a downlink control channel comprising a request from a scheduling entity to transmit acknowledgment information corresponding to one or more selected segments of the plurality of segments on the uplink control channel, and transmit the uplink control channel comprising the acknowledgment information corresponding to the one or more selected segments.

Another aspect of the disclosure provides a scheduled entity apparatus in a wireless communication network. The scheduled entity apparatus includes means for mapping a plurality of hybrid automatic repeat request (HARQ) processes to a plurality of segments of an uplink control channel, in which each of the segments is mapped to one of the HARQ processes. The scheduled entity apparatus further includes means for receiving a downlink control channel comprising a request from a scheduling entity to transmit acknowledgment information corresponding to one or more selected segments of the plurality of segments on the uplink control channel, and means for transmitting the uplink control channel comprising the acknowledgment information corresponding to the one or more selected segments.

Another aspect of the disclosure provides a non-transitory computer-readable medium storing computer-executable code including code for causing a scheduled entity apparatus to map a plurality of hybrid automatic repeat request (HARQ) processes to a plurality of segments of an uplink control channel, in which each of the segments is mapped to one of the HARQ processes. The non-transitory computer-readable medium further includes code for causing the scheduled entity apparatus to receive a downlink control channel comprising a request from a scheduling entity to transmit acknowledgment information corresponding to one or more selected segments of the plurality of segments on the uplink control channel, and transmit the uplink control channel comprising the acknowledgment information corresponding to the one or more selected segments.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In next generation (5G) networks, different formats for an uplink control channel, such as the physical uplink control channel (PUCCH), may be used to accommodate different payload sizes. In various aspects of the disclosure, one or more of the uplink control channel formats enables a flexible payload allocation to different types of uplink control information based on the reporting needs of a scheduled entity, such as a user equipment (UE). For example, ACK/NACK information may need to be reported every N subframes or slots, while channel quality information may need to be reported every M subframes or slots. In addition, a beam quality report may be triggered by an event, which may require the scheduled entity to flexibly assign a portion of the payload of the uplink control channel to the beam quality report.

In some examples, the number of bits used for ACK/NACK on the uplink control channel may be a function of the number of configured HARQ processes transmitted over a carrier frequency between the scheduling entity (e.g., base station) and the scheduled entity, which may limit the available payload for other control information. Therefore, in various aspects of the disclosure, the uplink control channel in one subframe or slot may include only a subset of the ACK/NACKs of the HARQ processes, while the remaining ACK/NACKs of the HARQ processes may be included in the uplink control channel(s) of one or more additional subframes or slots. Thus, the ACK/NACKs for all of the HARQ processes may be split over two or more subframes or slots, where each of the subframes or slots includes a respective uplink control channel transmitted by the scheduled entity at a different time. Thus, the remaining payload in each uplink control channel may be flexibly allocated to other control information, such as channel quality information and beam quality information.

Radio Access Network

Figure 1:
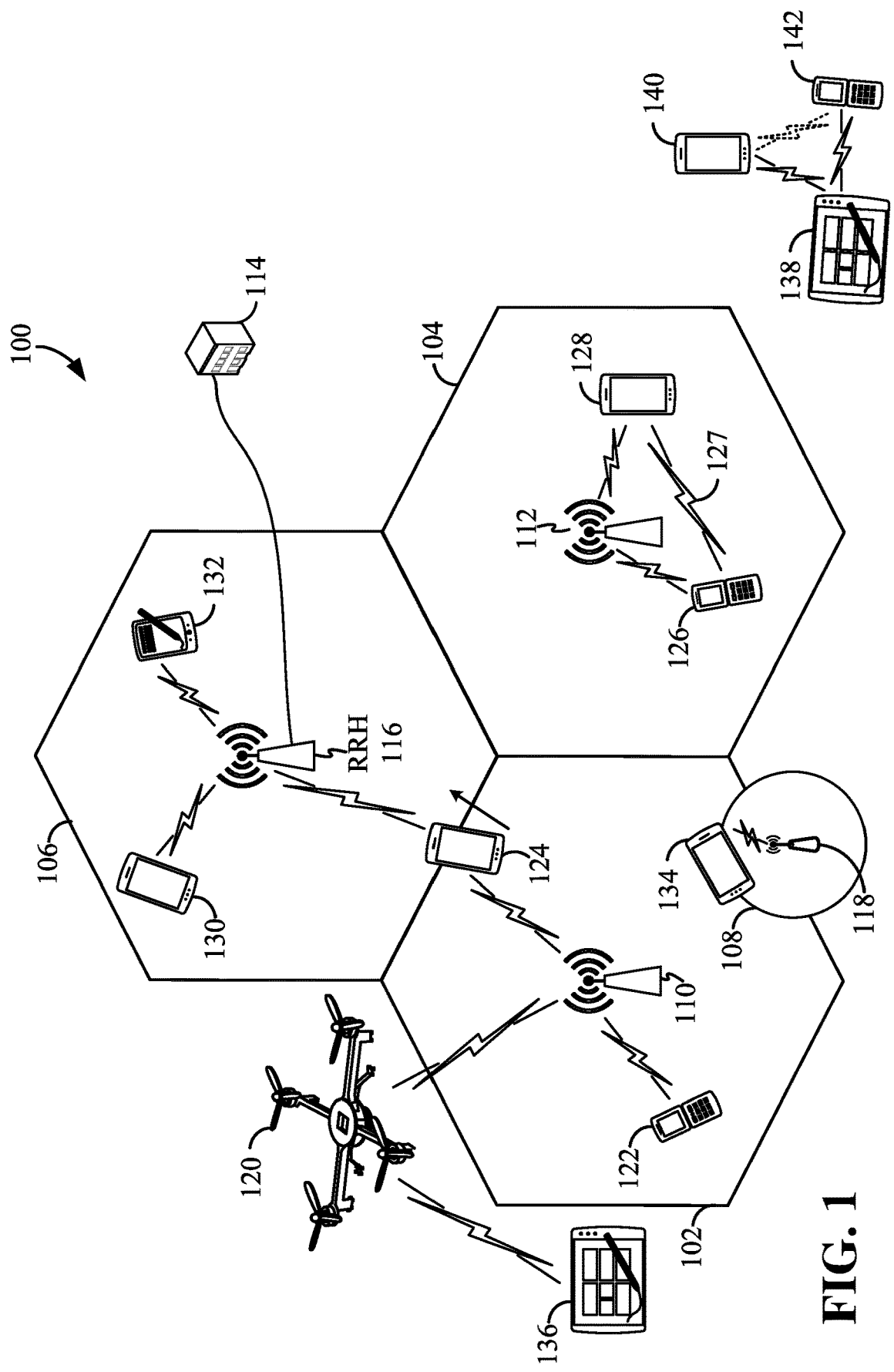
FIG. 1 is a diagram illustrating an example of an access network.

The various concepts presented throughout this disclosure may be implemented across a broad variety of telecommunication systems, network architectures, and communication standards. Referring now to FIG. 1, as an illustrative example without limitation, a simplified schematic illustration of an access network 100 is provided. The access network 100 may be a next generation (e.g., fifth generation (5G)) access network or a legacy (3G or 4G) access network. In addition, one or more nodes in the access network 100 may be next generation nodes or legacy nodes.

As used herein, the term legacy access network refers to a network employing a third generation (3G) wireless communication technology based on a set of standards that complies with the International Mobile Telecommunications-2000 (IMT-2000) specifications or a fourth generation (4G) wireless communication technology based on a set of standards that comply with the International Mobile Telecommunications Advanced (ITU-Advanced) specification. For example, some the standards promulgated by the 3rd Generation Partnership Project (3GPP) and the 3rd Generation Partnership Project 2 (3GPP2) may comply with IMT-2000 and/or ITU-Advanced. Examples of such legacy standards defined by the 3rd Generation Partnership Project (3GPP) include, but are not limited to, Long-Term Evolution (LTE), LTE-Advanced, Evolved Packet System (EPS), and Universal Mobile Telecommunication System (UMTS). Additional examples of various radio access technologies based on one or more of the above-listed 3GPP standards include, but are not limited to, Universal Terrestrial Radio Access (UTRA), Evolved Universal Terrestrial Radio Access (eUTRA), General Packet Radio Service (GPRS) and Enhanced Data Rates for GSM Evolution (EDGE). Examples of such legacy standards defined by the 3rd Generation Partnership Project 2 (3GPP2) include, but are not limited to, CDMA2000 and Ultra Mobile Broadband (UMB). Other examples of standards employing 3G/4G wireless communication technology include the IEEE 802.16 (WiMAX) standard and other suitable standards.

As further used herein, the term next generation access network generally refers to a network employing continued evolved wireless communication technologies. This may include, for example, a fifth generation (5G) wireless communication technology based on a set of standards. The standards may comply with the guidelines set forth in the 5G White Paper published by the Next Generation Mobile Networks (NGMN) Alliance on Feb. 17, 2015. For example, standards that may be defined by the 3GPP following LTE-Advanced or by the 3GPP2 following CDMA2000 may comply with the NGMN Alliance 5G White Paper. Standards may also include pre-3GPP efforts specified by Verizon Technical Forum (www.vstgf) and Korea Telecom SIG (www.kt5g.org).

The geographic region covered by the access network 100 may be divided into a number of cellular regions (cells) that can be uniquely identified by a user equipment (UE) based on an identification broadcasted over a geographical from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service user data traffic, and/or relevant QoS for transport of critical service user data traffic.

Within the access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or user data traffic from a base station (e.g., base station 110) to one or more UEs (e.g., UEs 122 and 124) may be referred to as downlink (DL) transmission, while transmissions of control information and/or user data traffic originating at a UE (e.g., UE 122) may be referred to as uplink (UL) transmissions. In addition, the uplink and/or downlink control information and/or user data traffic may be transmitted in slots, which may each include a certain number of symbols of variable duration. For example, the symbol duration may vary based on the cyclic prefix (e.g., normal or extended) and the numerology (e.g., subcarrier spacing) of the symbol. In some examples, a slot may include one or more mini-slots, which may refer to an encapsulated set of information capable of being independently decoded. One or more slots may be grouped together into a subframe. In addition, multiple subframes may be grouped together to form a single frame or radio frame. Any suitable number of subframes may occupy a frame. In addition, a subframe may have any suitable duration (e.g., 250 µs, 500 µs, 1 ms, etc.).

The air interface in the access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the access network 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per subframe.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, an access network 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target)

cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and slot/subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the access network 100. Each of the cells may measure a strength of the pilot signal, and the access network (e.g., one or more of the base stations 110 and 114/116 and/or a central node within the core network) may determine a serving cell for the UE 124. As the UE 124 moves through the access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Signaling Entities

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
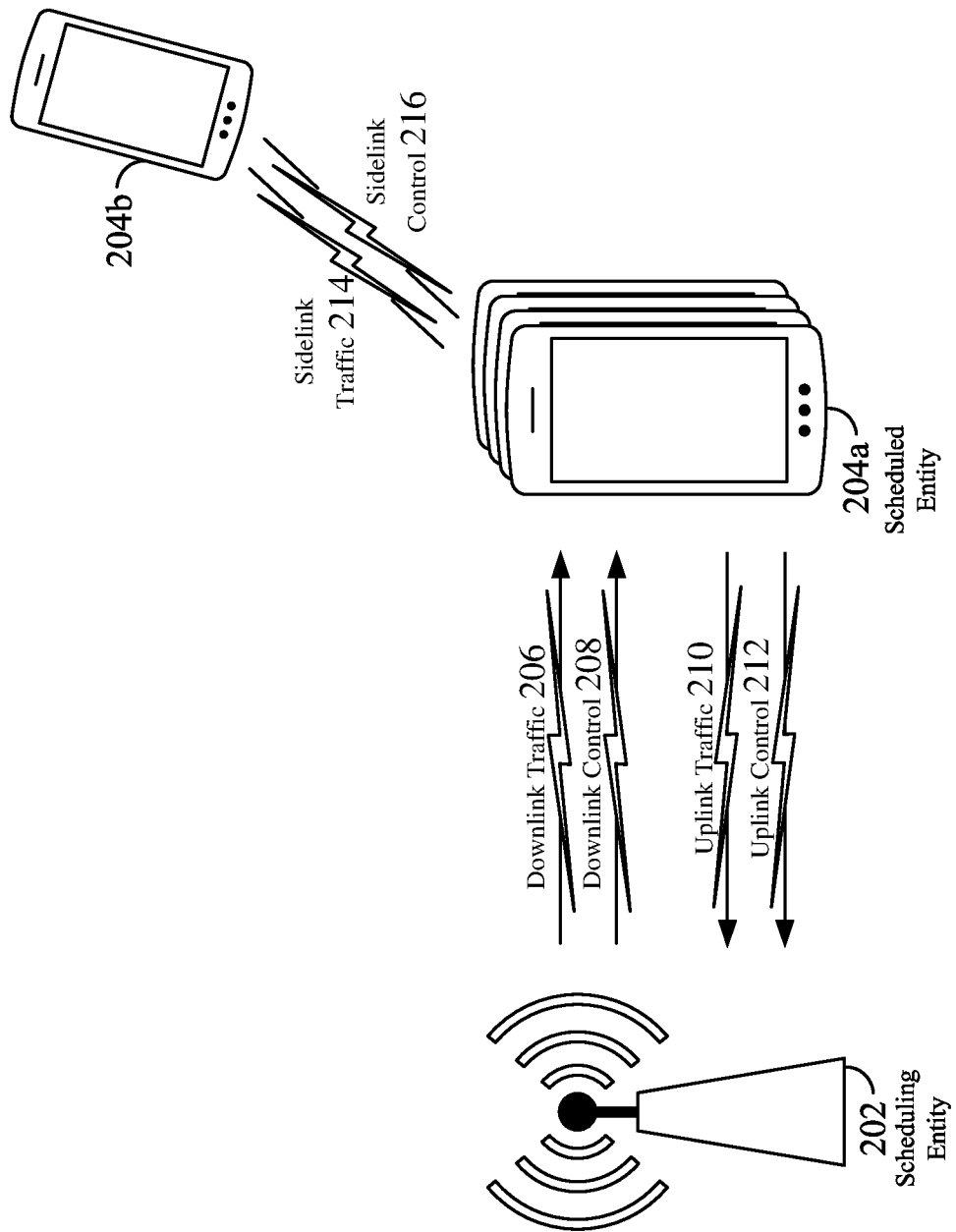
FIG. 2 is a block diagram conceptually illustrating an example of a scheduling entity communicating with one or more scheduled entities according to some embodiments.

Thus, in a wireless communication network with scheduled access to time-frequency resources and having a cellular configuration, a P2P configuration, or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204a and 204b). Here, the scheduling entity 202 may correspond to a base station 110, 112, 114, and/or 118. In additional examples, the scheduling entity 202 may correspond to a UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the access network 100.

As illustrated in FIG. 2, the scheduling entity 202 may broadcast user data traffic 206 to one or more scheduled entities 204 (the data may be referred to as downlink user data traffic). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink user data traffic 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink user data traffic 210 and/or downlink user data traffic 206 including one or more traffic channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control information and user data traffic may be organized by subdividing a carrier, in time, into suitable subframes or slots.

Furthermore, the scheduled entities 204 may transmit uplink control information 212 including one or more uplink control channels to the scheduling entity 202. Uplink control information may include a variety of packet types and categories, including pilots, reference signals, and information configured to enable or assist in decoding uplink user data traffic transmissions. In some examples, the control information 212 may include a scheduling request (SR), i.e., request for the scheduling entity 202 to schedule uplink transmissions. Here, in response to the SR transmitted on the control channel 212, the scheduling entity 202 may transmit downlink control information 208 that may schedule the slot for uplink packet transmissions.

Uplink and downlink transmissions may generally utilize a suitable error correcting block code. In a typical block code, an information message or sequence is split up into blocks, and an encoder at the transmitting device then mathematically adds redundancy to the information message. Exploitation of this redundancy in the encoded information message can improve the reliability of the message, enabling correction for any bit errors that may occur due to the noise. Some examples of error correcting codes include Hamming codes, Bose-Chaudhuri-Hocquenghem (BCH) codes, turbo codes, low-density parity check (LDPC) codes, and polar codes. Various implementations of scheduling entities 202 and scheduled entities 204 may include suitable hardware and capabilities (e.g., an encoder and/or decoder) to utilize any one or more of these error correcting codes for wireless communication.

In some examples, scheduled entities such as a first scheduled entity 204a and a second scheduled entity 204b may utilize sidelink signals for direct D2D communication. Sidelink signals may include sidelink data 214 and sidelink control 216. Sidelink control information 216 may include a source transmit signal (STS), a direction selection signal (DSS), a destination receive signal (DRS), and a physical sidelink HARQ indicator channel (PSHICH). The DSS/STS may provide for a scheduled entity 204 to request a duration of time to keep a sidelink channel available for a sidelink signal; and the DRS may provide for the scheduled entity 204 to indicate availability of the sidelink channel, e.g., for a requested duration of time. An exchange of DSS/STS and DRS signals (e.g., handshake) may enable different scheduled entities performing sidelink communications to negotiate the availability of the sidelink channel prior to communication of the sidelink data information (traffic) 214. The PSHICH may include HARQ acknowledgment information and/or a HARQ indicator from a destination device, so that the destination may acknowledge data received from a source device.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other user data traffic, control, and feedback channels.

Scheduling Entity

Figure 3:
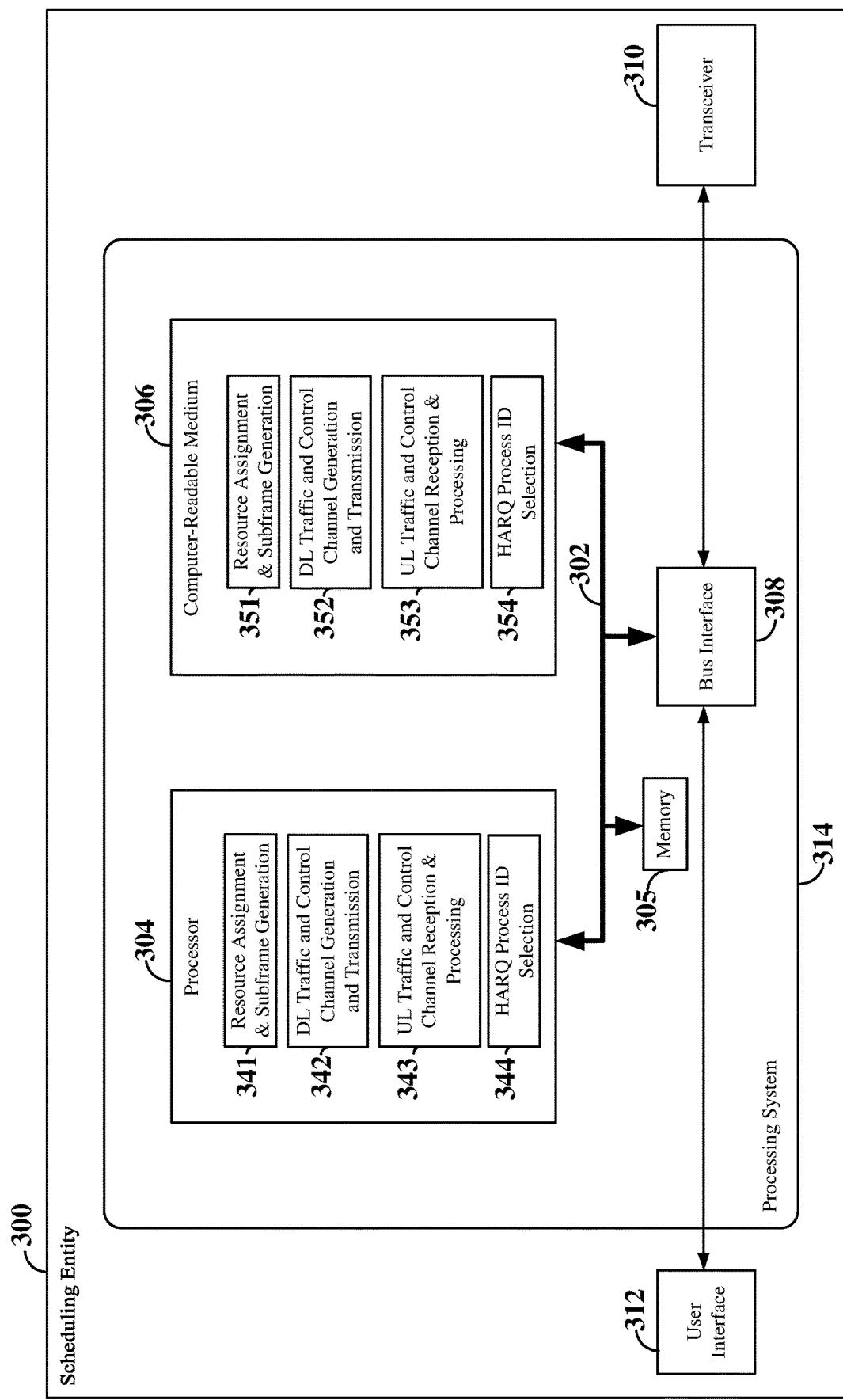
FIG. 3 is a block diagram illustrating an example of a hardware implementation for a scheduling entity employing a processing system according to some embodiments.

FIG. 3 is a conceptual diagram illustrating an example of a hardware implementation for an exemplary scheduling entity 300 employing a processing system 314. For example, the scheduling entity 300 may be a user equipment (UE) as illustrated in any one or more of FIGS. 1 and 2. In another example, the scheduling entity 300 may be a base station as illustrated in any one or more of FIGS. 1 and 2. For example, the scheduling entity 300 may be a next generation (5G) scheduling entity serving a macro or small cell.

The scheduling entity 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 300 may be configured to perform any one or more of the functions described herein. That is, the processor 304, as utilized in a scheduling entity 300, may be used to implement any one or more of the processes described below.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, peripherals, voltage regulators, and power management circuits, which are well known in the art, and therefore, will not be described any further. A bus interface 308 provides an interface between the bus 302 and a transceiver 310. The transceiver 310 provides a means for communicating with various other apparatus over a transmission medium. Depending upon the nature of the apparatus, a user interface 312 (e.g., keypad, display, speaker, microphone, joystick) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 304 may include circuitry configured for various functions. For example, the processor 304 may include resource assignment and scheduling circuitry 341, configured to generate, schedule, and modify a resource assignment or grant of time-frequency resources. For example, the resource assignment and scheduling circuitry 341 may generate one or more time division duplex (TDD) and/or frequency division duplex (FDD) subframes or slots, each including time-frequency resources assigned to carry user data traffic and/or control information to and/or from multiple scheduled entities. The resource assignment and scheduling circuitry 341 may operate in coordination with resource assignment and scheduling software 351.

The processor 304 may further include downlink (DL) traffic and control channel generation and transmission circuitry 342, configured to generate and transmit downlink user data traffic and control channels. For example, the DL traffic and control channel generation and transmission circuitry 342 may be configured to generate master information blocks (MIBs), system information blocks (SIBs), radio resource control (RRC) connection or configuration messages, random access message, and various control channels, such as a PBCH, a PSS, a SSS, a physical control format indicator channel (PCFICH), a physical hybrid automatic repeat request (HARQ) indicator channel (PHICH), and/or a physical downlink control channel (PDCCH). In addition, the DL traffic and control channel generation and transmission circuitry 342 may operate in coordination with the resource assignment and scheduling circuitry 341 to schedule the DL user data traffic and/or control information and to place the DL user data traffic and/or control information onto a time division duplex (TDD) or frequency division duplex (FDD) carrier within one or more subframes or slots in accordance with the resources assigned to the DL user data traffic and/or control information. The DL traffic and control channel generation and transmission circuitry 342 may further operate in coordination with DL traffic and control channel generation and transmission software 352.

The processor 304 may further include uplink (UL) traffic and control channel reception and processing circuitry 343, configured to receive and process uplink control channels, such as the physical uplink control channel (PUCCH), and uplink user data traffic channels, such as the physical uplink shared channel (PUSCH), from one or more scheduled entities. In some examples, the UL traffic and control channel reception and processing circuitry 343 may be configured to receive scheduling requests from one or more scheduled entities, the scheduling requests being configured to request a grant of time-frequency resources for uplink user data traffic transmissions. In other examples, the UL traffic and control channel reception and processing circuitry 343 may be configured to receive and process acknowledgment information (e.g., acknowledged/not acknowledged packets) from one or more scheduled entities. The UL traffic and control channel reception and processing circuitry 343 may further operate in coordination with the resource assignment and scheduling circuitry 341 to schedule UL user data traffic transmissions, DL user data traffic transmissions and/or DL user data traffic retransmissions in accordance with other received UL control channel information. The UL traffic and control channel reception and processing circuitry 343 may further operate in coordination with UL traffic and control channel reception and processing software 353.

The processor 304 may further include HARQ process ID selection circuitry 344, configured to select one or more HARQ process identifiers (ID) from a plurality of HARQ process IDs for a scheduled entity to transmit acknowledgment information (e.g., ACK/NACK feedback information) on an uplink control channel. The number of HARQ process IDs is configurable, and may be determined, for example, based on the type of duplexing (e.g., TDD or FDD), the subframe or slot structure and other factors. Each HARQ process ID identifies a respective stop and wait (SAW) parallel process running on the scheduling entity and the scheduled entity. The HARQ process ID selection circuitry 344 may further provide the selected HARQ process IDs to the DL traffic and control channel generation and transmission circuitry 342 for inclusion in a downlink control channel, such as the Physical Downlink Control Channel (PDCCH) or other Layer 1 signal.

In some examples, the HARQ process IDs are grouped into segments with each segment including at least one HARQ process ID. Each segment may further be identified by a segment index. The HARQ process ID selection circuitry 344 may select one or more segments for a particular scheduled entity to transmit the acknowledgment information of the HARQ processes in the selected segments. The HARQ process ID selection circuitry may further provide the selected segment indexes to the DL traffic and control channel generation and transmission circuitry 342 to include the selected segment indexes in the downlink control channel. The HARQ process ID selection circuitry 344 may further operate in coordination with HARQ process ID selection software 354.

Scheduled Entity

Figure 4:
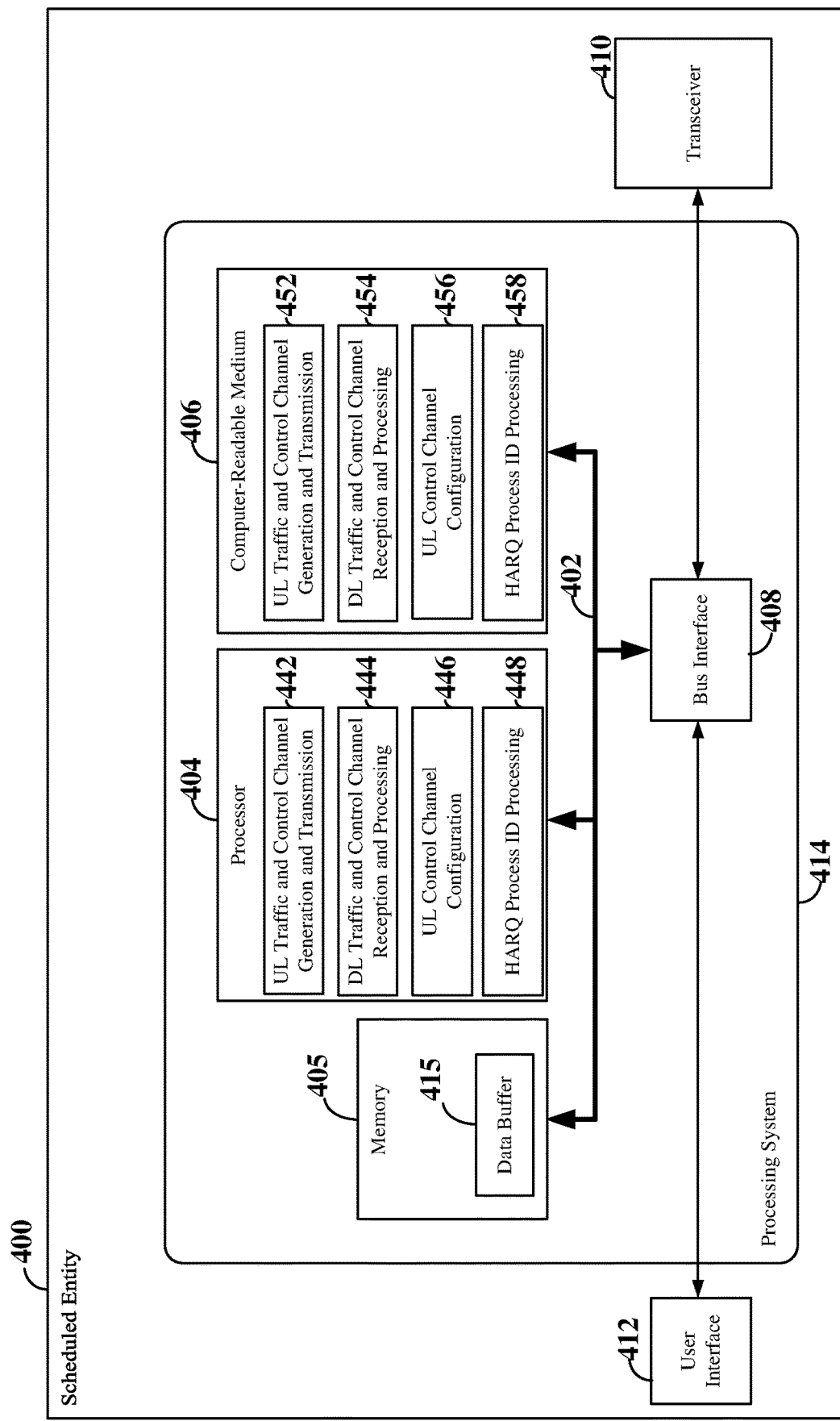
FIG. 4 is a block diagram illustrating an example of a hardware implementation for a scheduled entity employing a processing system according to some embodiments.

FIG. 4 is a conceptual diagram illustrating an example of a hardware implementation for an exemplary scheduled entity 400 employing a processing system 414. In accordance with various aspects of the disclosure, an element, or any portion of an element, or any combination of elements may be implemented with a processing system 414 that includes one or more processors 404. For example, the scheduled entity 400 may be a user equipment (UE) as illustrated in any one or more of FIGS. 1 and 2.

The processing system 414 may be substantially the same as the processing system 314 illustrated in FIG. 3, including a bus interface 408, a bus 402, memory 405, a processor 404, and a computer-readable medium 406. Furthermore, the scheduled entity 400 may include a user interface 412 and a transceiver 410 substantially similar to those described above in FIG. 3. That is, the processor 404, as utilized in a scheduled entity 400, may be used to implement any one or more of the processes described below.

In some aspects of the disclosure, the processor 404 may include uplink (UL) traffic and control channel generation and transmission circuitry 442, configured to generate and transmit uplink user data traffic on an UL user data traffic channel, and to generate and transmit uplink control/feedback/acknowledgment information on an UL control channel. The UL traffic and control channel generation and transmission circuitry 442 may operate in coordination with UL traffic and control channel generation and transmission software 452.

The processor 404 may further include downlink (DL) traffic and control channel reception and processing circuitry 444, configured for receiving and processing downlink user data traffic on a downlink user data traffic channel (e.g., the PDSCH), and to receive and process control information on one or more downlink control channels (e.g., the PDCCH). In some examples, received downlink user data traffic and/or control information may be temporarily stored in a data buffer 415 within memory 405. The DL traffic and control channel reception and processing circuitry 444 may operate in coordination with DL traffic and control channel reception and processing software 454.

The processor 404 may further include uplink control channel configuration circuitry 446, configured to dynamically configure the structure of a current uplink control channel by flexibly allocating portions of the payload of an uplink control channel to different types of control information, such as ACK/NACKs, channel quality information and beam information. In some examples, the uplink control channel is the PUCCH.

In some examples, the configured uplink control channel structure may have one of a plurality of different formats, where each format provides a different sized payload. The uplink control channel configuration circuitry 446 may select one of the possible formats for a current uplink control channel and utilize the selected format to configure the uplink control channel structure for the current uplink control channel. In some examples, the selected format may be dynamically selected by the uplink control channel configuration circuitry 446 based on the type and amount of control information to be transmitted. In other examples, the selected format may be provided by the scheduling entity and may be statically configured for the cell/network or dynamically selected by the scheduling entity based on expected uplink control information or as requested by the scheduled entity.

For each format, the uplink control channel configuration circuitry 446 may further determine the number of HARQ processes running on the scheduled entity for a carrier frequency and map each of the HARQ processes to a respective location in a payload section of the uplink control channel format. Thus, each uplink control channel format includes a payload format for a payload section, and the uplink control channel configuration circuitry 446 is further configured to map each of the HARQ processes to a respective location in the payload format. For example, if there are 10 HARQ processes for the scheduled entity 400, and each HARQ process requires one bit to transmit the acknowledgment information (e.g., either an ACK or a NACK), each HARQ process may be mapped to one bit in the payload format. As an example, HARQ process ID 0 may be mapped to payload bit 0, HARQ process ID 1 may be mapped to payload bit 1, and so on. Thus, each HARQ process has a designated location in the payload format to store its ACK/NACK bit. The mapping rules (e.g., HARQ process ID to bit location) for each format may be pre-defined or determined based on, for example, Radio Resource Control (RRC) signaling from the scheduling entity. In addition, the mapping rules for each format may be different for each carrier frequency utilized by the scheduling and scheduled entities.

For each format, the uplink control channel configuration circuitry 446 may further divide the payload format into segments, where each segment includes bits mapped to one or more HARQ processes. The payload format may be divided into equal segments or non-equal segments. In addition, each segment may be referenced by a segment index. The segments may be pre-defined, dynamically determined by the uplink control channel configuration circuitry 446 based on the HARQ processes currently running, or determined based on, for example, RRC signaling from the scheduling. For example, a first segment may include payload bits 0-4, corresponding to HARQ process IDs 0-4, and a second segment may include payload bits 5-9, corresponding to HARQ process IDs 5-9.

The uplink control channel configuration circuitry 446 may further receive a request from the scheduling entity via the DL traffic and control channel reception and processing circuitry 444 to transmit the acknowledgment information corresponding to one or more selected HARQ processes and/or one or more selected segment indexes on the current uplink control channel. In some examples, the request is included within a downlink control channel (e.g., the PDCCH). Based on the request, the uplink control channel configuration circuitry 446 configures the uplink control channel structure for the current uplink control channel to have the selected payload format, utilizes the mapping rules to determine which bits in the payload of the current uplink control channel will include acknowledgment information, and flexibly allocates the remaining bits (remaining portion of the payload) to other control information. Thus, when the scheduling entity selects less than all of the HARQ processes, the uplink control information configuration circuitry 446 may utilize the bits corresponding to non-selected HARQ processes for other control information.

In some examples, the payload format may include an acknowledgment section within which the acknowledgment information may be placed, and a control information section within which other control information may be placed. Each HARQ process may be mapped to a location within the acknowledgment section based on the mapping rules. When the scheduling entity selects all of the HARQ processes or all of the segment indexes for inclusion in the current uplink control channel, the uplink control channel configuration circuitry 446 may utilize only the control information section of the payload for other control information. However, when the scheduling entity selects less than all of the HARQ processes and/or segment indexes for inclusion in the current uplink control channel, the uplink control channel configuration circuitry 446 may utilize not only the control information section of the payload, but also the unused (remaining) portion of the acknowledgment section of the payload, to transmit other control information. Using the above example for segments 1 and 2, and assuming the maximum payload size for the selected uplink control channel format is 22 bits, if the scheduling entity requests the scheduled entity transmit the ACK/NACKs for segment 1, 5 bits of the payload will be used for ACK/NACKs (corresponding to HARQ process IDs 0-4), while the remaining 17 bits may be utilized for other control information. Similarly, if the scheduling entity requests the scheduled entity transmit the ACK/NACKs for both segments 1 and 2, 10 bits will be used for the ACK/NACKs, while the 12 remaining bits (corresponding to the control information section) may be used for other control information.

In addition, the uplink control channel configuration circuitry 446 may further allocate the bits in the control information section to various types of control information based on one or more other factors. For example, the allocation of bits in the control information section may be pre-determined, dynamically configured or defined based on, for example, Radio Resource Control (RRC) signaling from the scheduling entity. In some examples, the uplink control channel configuration circuitry 446 may allocate control information section bits to particular types of control information based on the type of control information that needs to be transmitted to the scheduling entity. For example, assuming the maximum payload size for the selected uplink control channel format is 22 bits, and the control information section includes 12 of the total bits, if an event triggers a beam quality report, the uplink control channel configuration circuitry 446 may allocate 9 bits to beam quality information and 3 bits to other control information.

The uplink control channel configuration circuitry 446 may further provide the configured uplink control channel structure having the selected format and bits allocated to acknowledgment information and other control information based on the selected HARQ processes, mapping rules and other factors to the UL traffic and control channel generation and transmission circuitry 442 to generate the current uplink control channel to be transmitted on a current subframe or slot. The uplink control channel configuration circuitry 446 may further operate in coordination with uplink control channel configuration software 456.

The processor 404 may further include HARQ process ID processing circuitry 448, configured to receive, from the scheduling entity, one or more selected HARQ process IDs or one or more selected segment indexes indicating the acknowledgment information selected to be transmitted on a current uplink control channel in a current subframe or slot. The selected HARQ process IDs and/or segment indexes may be received from the scheduling entity on a downlink control channel. The HARQ process ID circuitry 448 is further configured to provide the one or more selected HARQ process IDs and/or one or more selected segment indexes to the uplink control channel configuration circuitry 446 for use in configuring the payload of the current uplink control channel. In addition, the HARQ process ID circuitry 448 is configured to obtain the acknowledgment information (e.g., ACK or NACK) for each of the selected HARQ processes and provide the acknowledgment information to the UL traffic and control channel generation and transmission circuitry 442 for inclusion in the current uplink control channel transmitted to the scheduling entity. The HARQ process ID processing circuitry 448 may further operate in coordination with HARQ process ID processing software 458.

Subframe Structure

Figure 5:
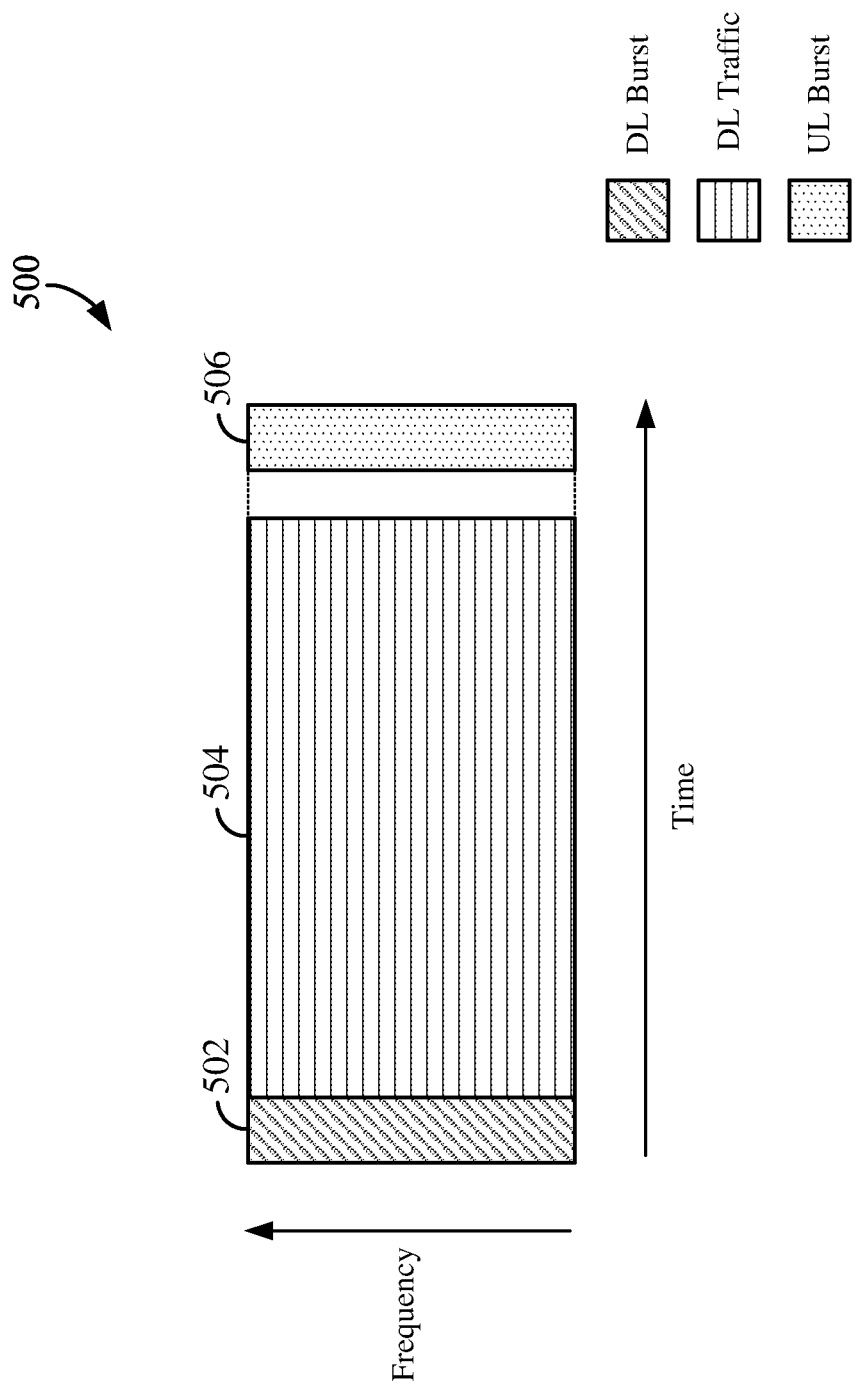
FIG. 5 is a diagram illustrating an example of a downlink (DL)-centric subframe according to some aspects of the present disclosure.

According to various aspects of the disclosure, wireless communication may be implemented by dividing transmissions, in time, into frames, wherein each frame may be further divided into subframes or slots. These subframes or slots may be DL-centric, UL-centric, or sidelink-centric, as described below. For example, FIG. 5 is a diagram showing an example of a time-frequency representation of a DL-centric subframe 500 (or DL-centric slot), so called because a majority (or, in some examples, a substantial portion) of the subframe includes DL data. In the example shown in FIG. 5, time is illustrated along a horizontal axis, while frequency is illustrated along a vertical axis. The time-frequency resources of the DL-centric subframe 500 may be divided into a DL burst 502, a DL traffic portion 504 and an UL burst 506.

The DL burst 502 may exist in the initial or beginning portion of the DL-centric subframe. The DL burst 502 may include any suitable DL information in one or more channels. In some examples, the DL burst 502 may include scheduling information and/or control information corresponding to various portions of the DL-centric subframe. In some configurations, the DL burst 502 may include a physical DL control channel (PDCCH). The DL traffic portion 504 may sometimes be referred to as the payload of the DL-centric subframe. The DL traffic portion 504 may include the communication resources utilized to communicate DL user data traffic from the scheduling entity 202 (e.g., eNB) to the scheduled entity 204 (e.g., UE). In some configurations, the DL traffic portion 504 may include a physical DL shared channel (PDSCH).

The UL burst 506 may include any suitable UL information in one or more channels. In some examples, the UL burst 506 may include feedback information corresponding to various other portions of the DL-centric subframe. For example, the UL burst 506 may include feedback information corresponding to the DL burst 502 and/or DL traffic portion 504. Non-limiting examples of feedback information may include an ACK signal, a NACK signal, a HARQ indicator, and/or various other suitable types of information. The UL burst 506 may include additional or alternative information, such as information pertaining to random access channel (RACH) procedures, scheduling requests (SRs), and various other suitable types of information. In some configurations, the UL burst 506 may include a physical uplink control channel (PUCCH) and/or a physical hybrid automatic repeat request (HARQ) indicator channel (PHICH).

As illustrated in FIG. 5, the end of the DL traffic portion 504 may be separated in time from the beginning of the UL burst 506. This time separation may sometimes be referred to as a gap, a guard period, a guard interval, and/or various other suitable terms. This separation provides time for the switch-over from DL communication (e.g., reception operation by the scheduled entity 204 (e.g., UE)) to UL communication (e.g., transmission by the scheduled entity 204 (e.g., UE)). One of ordinary skill in the art will understand that the foregoing is merely one example of a DL-centric subframe and alternative structures having similar features may exist without necessarily deviating from the aspects described herein.

Figure 6:
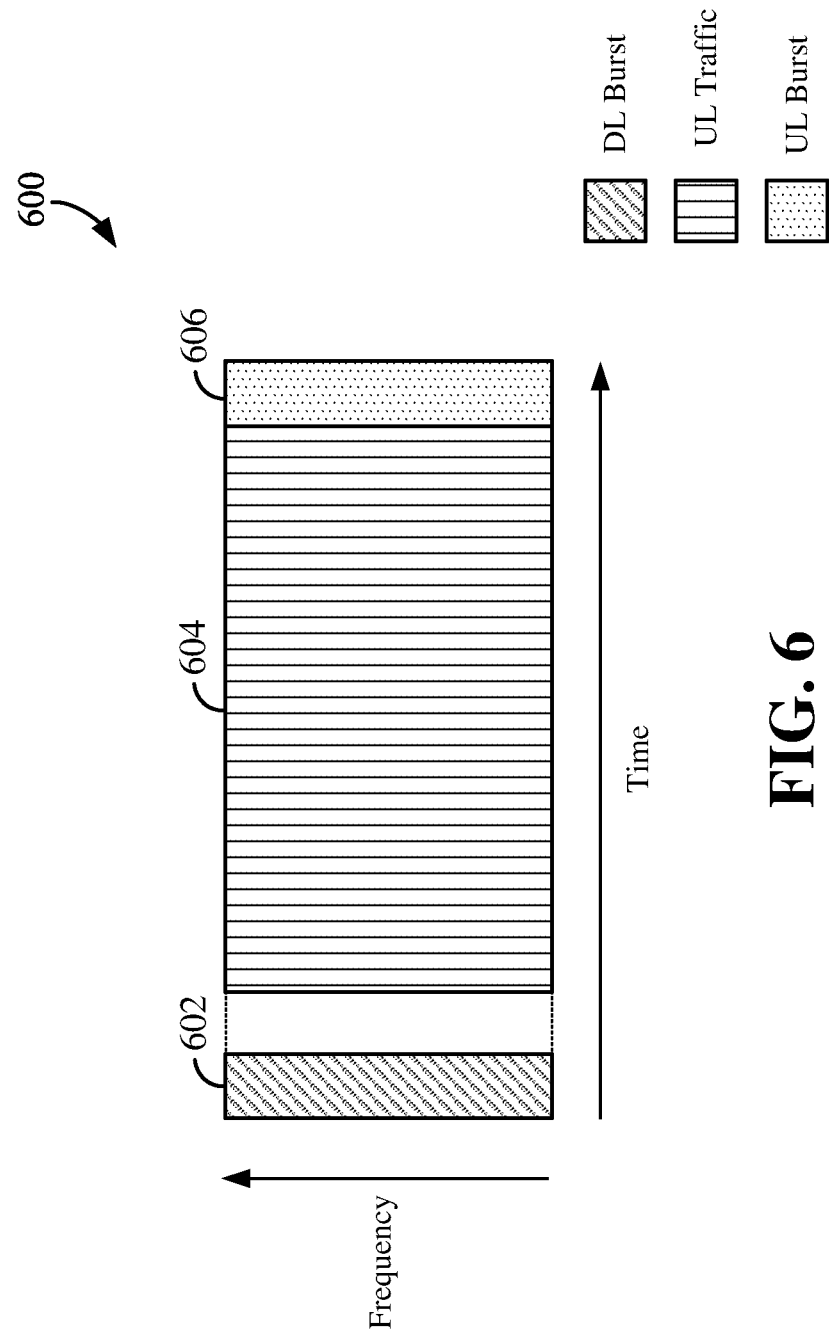
FIG. 6 is a diagram illustrating an example of an uplink (UL)-centric subframe according to some aspects of the present disclosure.

FIG. 6 is a diagram showing an example of a time-frequency representation of an UL-centric subframe 600 (or UL-centric slot), so called because a majority (or, in some examples, a substantial portion) of the subframe includes UL data. In the example shown in FIG. 6, time is illustrated along a horizontal axis, while frequency is illustrated along a vertical axis. The time-frequency resources of the UL-centric subframe 600 may be divided into a DL burst 602, an UL traffic portion 604 and an UL burst 606.

The DL burst 602 may exist in the initial or beginning portion of the UL-centric subframe. The DL burst 602 in FIG. 6 may be similar to the DL burst 502 described above with reference to FIG. 5. The UL traffic portion 604 may sometimes be referred to as the payload of the UL-centric subframe. The UL traffic portion 604 may include the communication resources utilized to communicate UL user data traffic from the scheduled entity 204 (e.g., UE) to the scheduling entity 202 (e.g., eNB). In some configurations, the UL traffic portion 604 may include a physical UL shared channel (PUSCH). The UL traffic portion 604 may also include a physical uplink control channel (PUCCH). As illustrated in FIG. 6, the end of the DL burst 602 may be separated in time from the beginning of the UL traffic portion 604. This time, separation may sometimes be referred to as a gap, guard period, guard interval, and/or various other suitable terms. This separation provides time for the switch-over from DL communication (e.g., reception operation by the scheduling entity 202 (e.g., UE)) to UL communication (e.g., transmission by the scheduling entity 202 (e.g., UE)).

The UL burst 606 in FIG. 6 may be similar to the UL burst 506 described above with reference to FIG. 5. The UL burst 606 may additionally or alternatively include information pertaining to channel quality indicator (CQI), sounding reference signals (SRSs), and various other suitable types of information. In some configurations, the UL burst 606 may include a physical uplink control channel (PUCCH) and/or a physical hybrid automatic repeat request (HARQ) indicator channel (PHICH). One of ordinary skill in the art will understand that the foregoing is merely one example of an UL-centric subframe, and alternative structures having similar features may exist without necessarily deviating from the aspects described herein.

Uplink Control Channel

Figure 7:
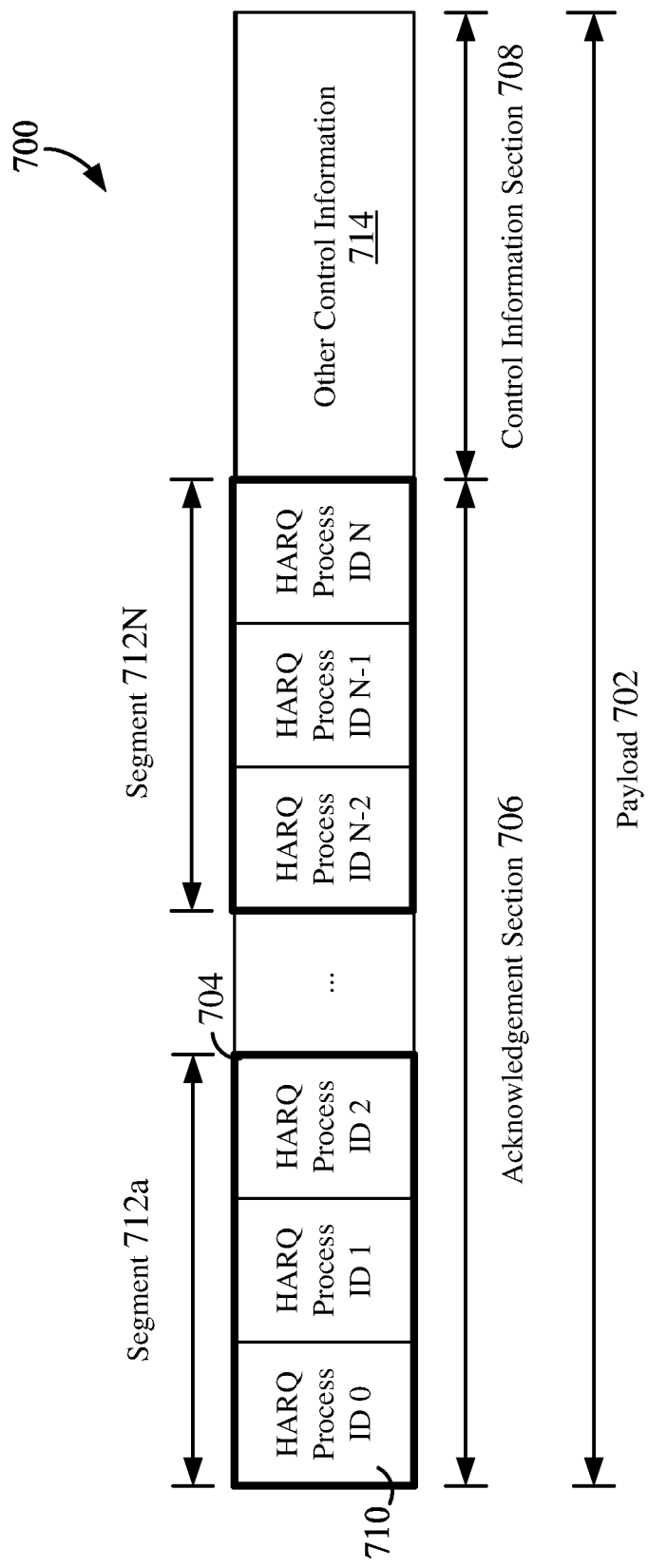
FIG. 7 is a diagram showing an example of an uplink control channel according to some aspects of the present disclosure.

FIG. 7 is a diagram showing an example of an uplink control channel 700 to be transmitted by a scheduled entity (UE). In some examples, the uplink control channel 700 is a PUCCH. The uplink control channel 700 may be transmitted, for example, within the UL burst 502 shown in FIG. 5 or the UL burst 602 shown in FIG. 6, and may include all or a portion of the full system bandwidth. The uplink control channel 700 includes a payload 702 having a number of payload bits 704 that may be flexibly allocated to different types of control information, such as ACK/NACKs, channel quality information, beam information (e.g., beam quality information, such as the beam ID and signal strength estimation of each beam transmitted by the scheduling entity), and other types of control information. The uplink control channel 700 illustrated in FIG. 7 corresponds to a particular format (e.g., a particular sized payload 702). It should be noted that the uplink control channel format shown in FIG. 7 is merely illustrative, and the present disclosure is not limited to any particular format.

The payload 702 of the uplink control channel 700 includes an acknowledgment section 706 and a control information section 708. The acknowledgment section 706 includes a number of payload bits 704 that may be allocated to acknowledgment information 710 (e.g., ACK/NACK bits). The number of payload bits 704 allocated to the acknowledgment information 710 corresponds to a number of HARQ processes running on a scheduling entity and scheduled entity. In the example shown in FIG. 7, there are N HARQ processes (e.g., HARQ Process ID 0, HARQ Process ID 1, HARQ Process ID 2, . . . HARQ Process ID N-2, HARQ Process ID N-1, and HARQ Process ID N). Each of the HARQ processes may be mapped to a respective location (e.g., payload bit 704) within the acknowledgment section 706. For example, HARQ Process ID 0 is shown mapped to payload bit 0, HARQ process ID 1 is shown mapped to payload bit 1, and so on.

The acknowledgment section 706 may further be divided into segments 712a . . . 712N, where each segment includes bits mapped to one or more HARQ processes. The segments 712a . . . 712N may each include an equal number of payload bits 704 or non-equal numbers of payload bits 704. In the example shown in FIG. 7, a first segment 710a includes payload bits 0-2 corresponding to HARQ Process ID 0, HARQ Process ID 1, and HARQ Process ID 2, while an $N^{th}$ segment 710N includes payload bits N-2, N-1, and N corresponding to HARQ Process ID N-2, HARQ Process ID N-1, and HARQ Process ID N. Other segments may include other HARQ Process IDs, and may include the same or a different number of payload bits (HARQ Process IDs). Each segment 712a . . . 712N may be referenced by a segment index.

The control information section 708 includes a number of payload bits 704 that may be allocated to other control information 714, including, for example, pilots, reference signals, scheduling requests (SR), channel quality information (CQI), and/or beam information. In some examples, the payload bits 704 of the control information section 708 may be allocated to particular types of control information 714 based on the type of control information that needs to be transmitted on a current uplink control channel 700. For example, assuming the maximum payload size for the selected uplink control channel format is 22 bits, and the control information section 708 includes 12 of the total bits, if an event triggers a beam quality report, 9 of the 12 bits may be allocated to beam quality information and 3 bits to other control information.

Figure 8:
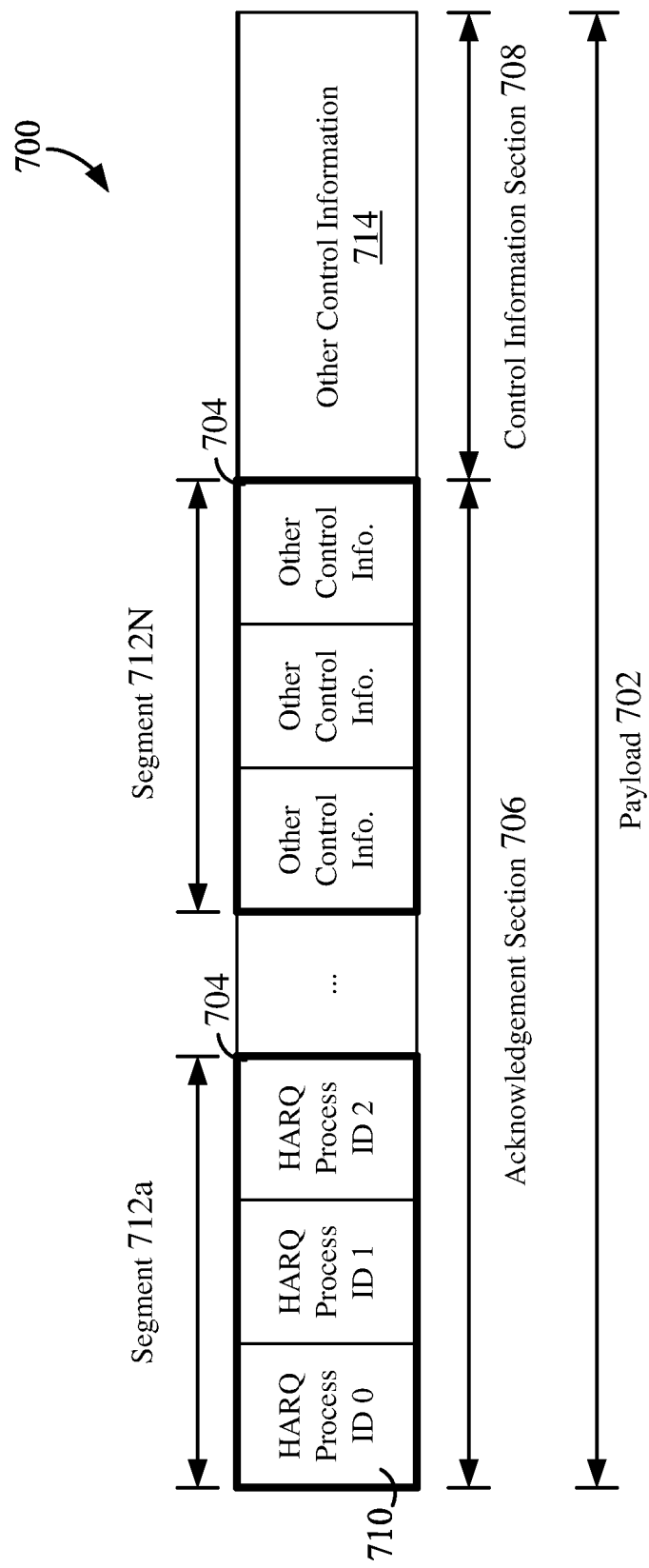
FIG. 8 is a diagram showing an example of a flexibly allocated payload of an uplink control channel according to some aspects of the present disclosure.

In addition to the flexible allocation of payload bits 704 to the acknowledgment section 706 and to other control information 714 within a control information section 708, in various aspects of the disclosure, the payload bits 704 allocated to the acknowledgment section 706 may further be flexibly allocated to other types of control information based on the HARQ processes selected for inclusion in a current uplink control channel 700. FIG. 8 is a diagram showing an example of a flexibly allocated payload 702 of an uplink control channel 700 according to some aspects of the present disclosure. In the example shown in FIG. 8, the acknowledgment section 706 is divided into a number of segments 712a . . . 712N, and the selected HARQ processes and/or selected segment indexes for the current uplink control channel 700 correspond to all segments except segment 712N, which is mapped to HARQ Process ID N-2, HARQ Process ID N-1, and HARQ Process ID N, as shown in FIG. 7.

Since the selected HARQ processes includes less than all of the HARQ processes, the payload bits 704 corresponding to the non-selected HARQ processes (e.g., segment 712N) may also be used for other control information 714. Thus, the payload bits 704 corresponding to segment 712N may be allocated to any other type of control information 714 needing to be transmitted within the current uplink control channel 700.

Flexible Control Information Reporting

Figure 9:
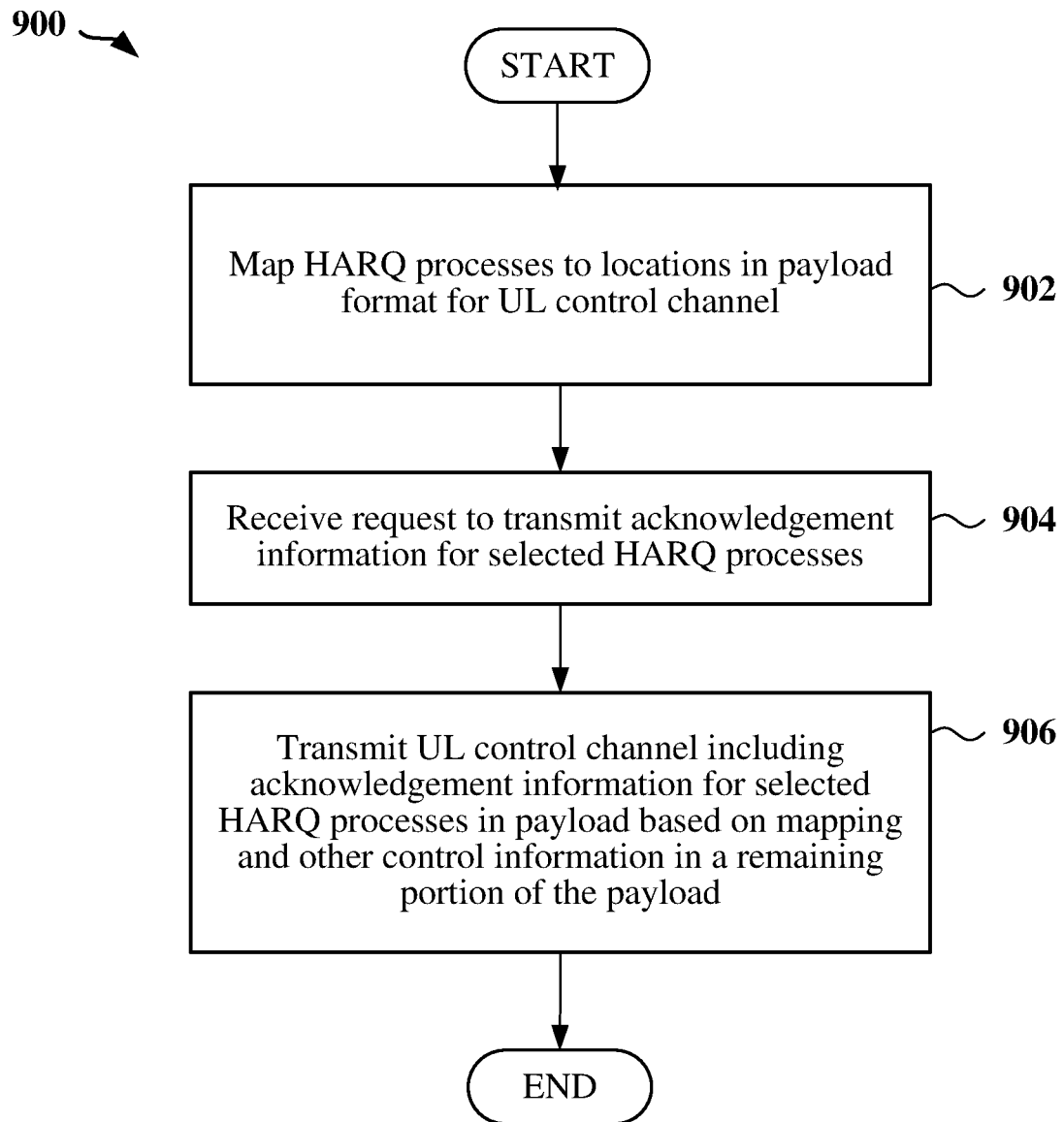
FIG. 9 is a flow chart of a method for flexibly providing uplink control information from a scheduled entity to a scheduling entity according to some embodiments.

FIG. 9 is a flow chart illustrating an exemplary process 900 for flexibly providing uplink control information from a scheduled entity to a scheduling entity in a wireless network in accordance with some aspects of the present disclosure.

As described below, some or all illustrated features may be omitted in a particular implementation within the scope of the present disclosure, and some illustrated features may not be required for implementation of all embodiments. In some examples, the process 900 may be carried out by the scheduled entity 400 illustrated in FIG. 4. The scheduled entity may be in wireless communication with the scheduling entity 300 illustrated in FIG. 3. In some examples, the process 900 may be carried out by any suitable apparatus or means for carrying out the functions or algorithm described below.

At block 902, the scheduled entity maps HARQ processes running on the scheduled entity and the scheduling entity to respective locations in a payload format for an uplink control channel. For example, the uplink control channel configuration circuitry 446 shown and described above in reference to FIG. 4 may map the HARQ process IDs to corresponding locations in an acknowledgment section of the payload format.

At block 904, the scheduled entity receives a request from the scheduling entity to transmit acknowledgment information (e.g., ACKs/NACKs) corresponding to one or more selected HARQ processes on a current uplink control channel having a payload with the payload format. For example, the DL traffic and control reception and processing circuitry 444 shown and described above in reference to FIG. 4 may receive a downlink control channel including the request and provide the request to the HARQ process ID processing circuitry 448, which further provides the selected HARQ processes to the uplink control channel configuration circuitry 446, as shown and described above in reference to FIG. 4.

At block 906, the scheduled entity transmits the current control channel including acknowledgment information corresponding to the selected HARQ processes in the payload thereof based on the mapping. In addition, the scheduled entity may include other control information within the remaining portion of the payload of the current uplink control channel. For example, the uplink control channel configuration circuitry 446 may configure the uplink control channel structure for the current uplink control channel based on the selected HARQ processes, the mapping of HARQ processes to locations in the payload, the size (e.g., number of payload bits) in the remaining portion of the payload, and the other control information to be transmitted, as shown and described above in reference to FIG. 4. In some examples, the other control information may include beam quality information and/or channel quality information. In addition, the HARQ process ID processing circuitry 448 may obtain the acknowledgment information (e.g., ACK or NACK) for each of the selected HARQ processes and provide the acknowledgment information to the UL traffic and control channel generation and transmission circuitry 442 for inclusion in the current uplink control channel to be transmitted to the scheduling entity as shown and described above in reference to FIG. 4.

Figure 10:
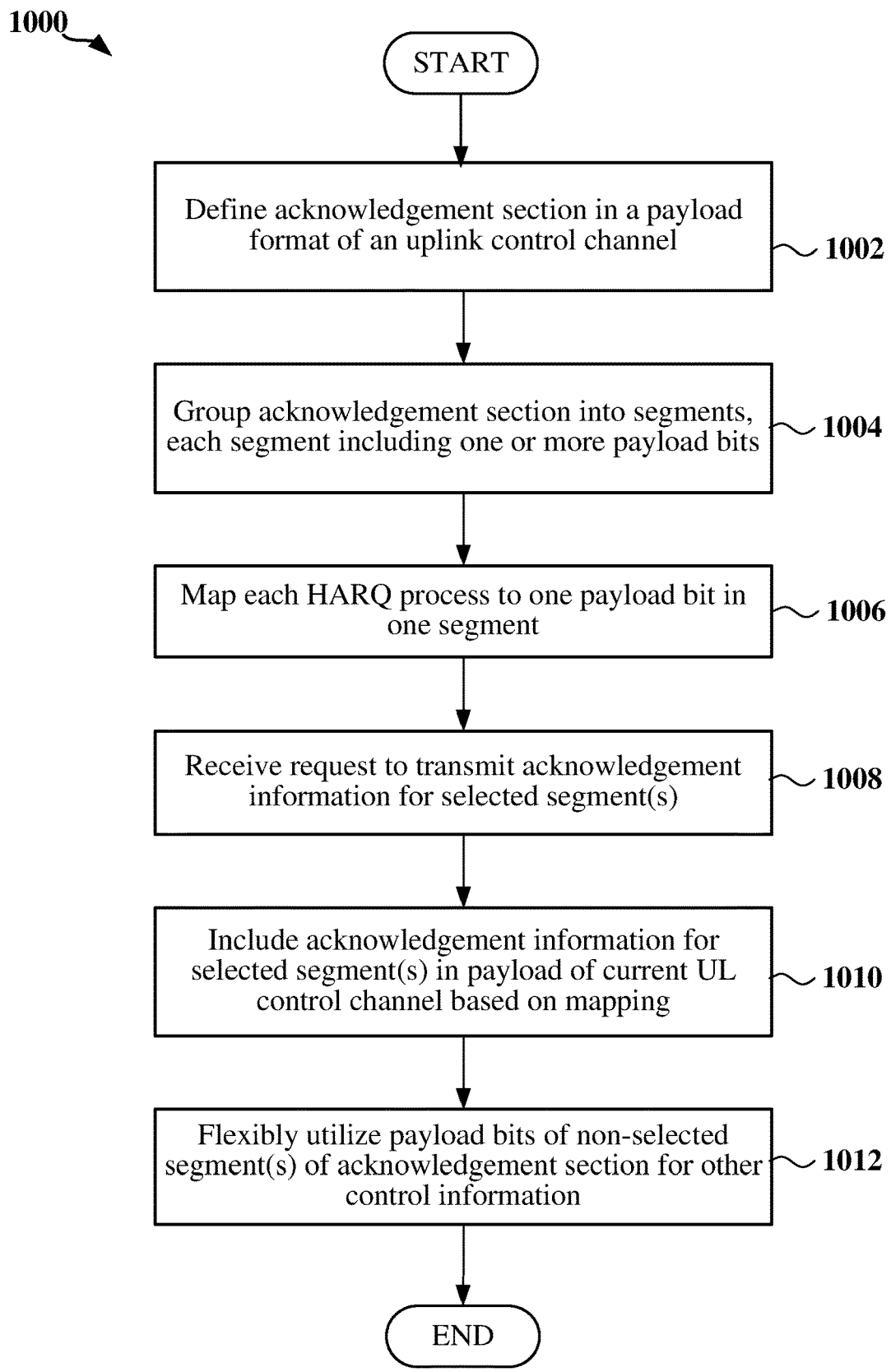
FIG. 10 is a flow chart of another method for flexibly providing uplink control information from a scheduled entity to a scheduling entity according to some embodiments.

FIG. 10 is a flow chart illustrating another exemplary process 1000 for flexibly providing uplink control information from a scheduled entity to a scheduling entity in a wireless network in accordance with some aspects of the present disclosure. As described below, some or all illustrated features may be omitted in a particular implementation within the scope of the present disclosure, and some illustrated features may not be required for implementation of all embodiments. In some examples, the process 1000 may be carried out by the scheduled entity 400 illustrated in FIG. 4. The scheduled entity may be in wireless communication with the scheduling entity 300 illustrated in FIG. 3. In some examples, the process 1000 may be carried out by any suitable apparatus or means for carrying out the functions or algorithm described below.

At block 1002, the scheduled entity defines an acknowledgment section in a payload format of an uplink control channel. The payload format may be one of a plurality of payload formats for the uplink control channel, and the payload format may include other sections, such as a control information section. For example, the uplink control channel configuration circuitry 446 shown and described above in reference to FIG. 4 may define an acknowledgment section in a particular payload format of an uplink control channel.

At block 1004, the scheduled entity groups the acknowledgment section into segments, where each segment includes one or more payload bits within the acknowledgment section of the uplink control channel. In some examples, the scheduled entity groups the acknowledgment section into equal sized segments, where each segment includes the same number of payload bits. In other examples, the scheduled entity groups the acknowledgment section into non-equal sized segments, where one or more of the segments includes a different number of payload bits. For example, the uplink control channel configuration circuitry 446 shown and described above in reference to FIG. 4 may group the acknowledgment section into segments.

At block 1006, the scheduled entity maps HARQ processes running on the scheduled entity and the scheduling entity to respective locations in the acknowledgment section. In some examples, each HARQ process is mapped to one payload bit in one segment of the acknowledgment section. For example, the uplink control channel configuration circuitry 446 shown and described above in reference to FIG. 4 may map the HARQ process IDs to corresponding locations in the acknowledgment section.

At block 1006, the scheduled entity receives a request from the scheduling entity to transmit acknowledgment information corresponding to one or more selected segments on a current uplink control channel having a payload with the payload format. For example, the DL traffic and control reception and processing circuitry 444 shown and described above in reference to FIG. 4 may receive a downlink control channel including the request and provide the request to the HARQ process ID processing circuitry 448, which further provides the selected HARQ processes corresponding to the selected segments to the uplink control channel configuration circuitry 446, as shown and described above in reference to FIG. 4.

At block 1008, the scheduled entity includes the acknowledgment information corresponding to the HARQ processes of the selected segment(s) in the payload of the current uplink control channel based on the mapping. For example, the uplink control channel configuration circuitry 446 may configure the uplink control channel structure for the current uplink control channel based on the selected segments and the mapping, as shown and described above in reference to FIG. 4. In addition, the HARQ process ID processing circuitry 448 may obtain the acknowledgment information (e.g., ACK or NACK) for each of the HARQ processes in the selected segments and provide the acknowledgment information to the UL traffic and control channel generation and transmission circuitry 442 for inclusion in the current uplink control channel to be transmitted to the scheduling entity, as shown and described above in reference to FIG. 4.

At block 1010, the scheduled entity flexibly utilizes the payload bits corresponding to the non-selected segments of the acknowledgment section of the current uplink control channel for other control information. For example, the uplink control channel configuration circuitry 446 may configure the acknowledgment section for the current uplink control channel based on the selected segments, the HARQ process mapping, and the other control information to be transmitted, as shown and described above in reference to FIG. 4.

Figure 11:
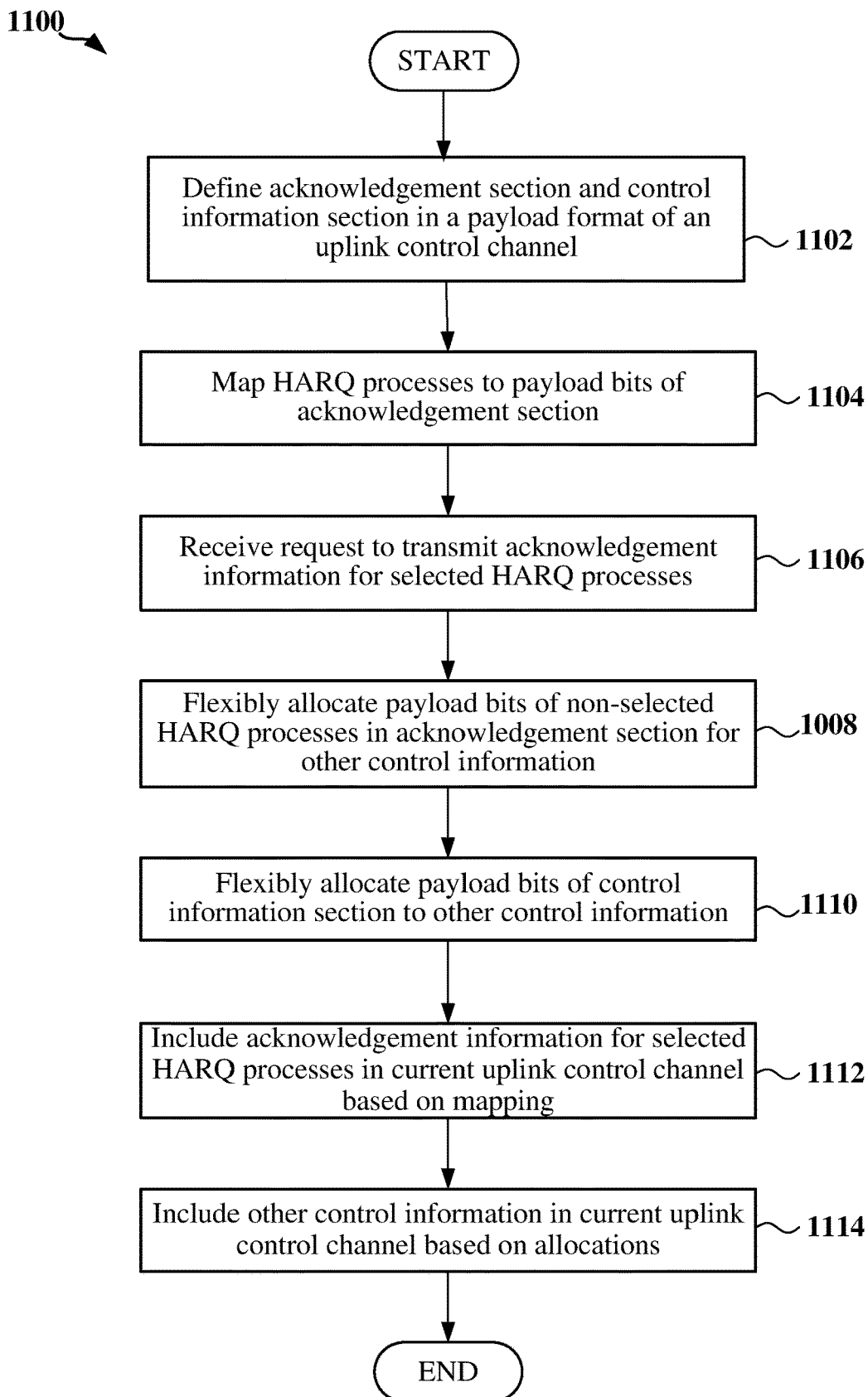
FIG. 11 is a flow chart of another method for flexibly providing uplink control information from a scheduled entity to a scheduling entity according to some embodiments.

FIG. 11 is a flow chart illustrating another exemplary process 1100 for flexibly providing uplink control information from a scheduled entity to a scheduling entity in a wireless network in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the scheduled entity 400 illustrated in FIG. 4. The scheduled entity may be in wireless communication with the scheduling entity 300 illustrated in FIG. 3. In some examples, the process 1100 may be carried out by any suitable apparatus or means for carrying out the functions or algorithm described below.

At block 1102, the scheduled entity defines an acknowledgment section and a control information section in a payload format of an uplink control channel. The payload format may be one of a plurality of payload formats for the uplink control channel. For example, the uplink control channel configuration circuitry 446 shown and described above in reference to FIG. 4 may define an acknowledgment section and a control information section in a particular payload format of an uplink control channel.

At block 1104, the scheduled entity maps HARQ processes running on the scheduled entity and the scheduling entity to respective locations in the acknowledgment section. In some examples, each HARQ process is mapped to one payload bit of the acknowledgment section. For example, the uplink control channel configuration circuitry 446 shown and described above in reference to FIG. 4 may map the HARQ process IDs to corresponding locations in the acknowledgment section.

At block 1106, the scheduled entity receives a request from the scheduling entity to transmit acknowledgment information corresponding to one or more selected HARQ processes on a current uplink control channel having a payload with the payload format. For example, the DL traffic and control reception and processing circuitry 444 shown and described above in reference to FIG. 4 may receive a downlink control channel including the request and provide the request to the HARQ process ID processing circuitry 448, which further provides the selected HARQ processes to the uplink control channel configuration circuitry 446, as shown and described above in reference to FIG. 4.

At block 1108, the scheduled entity flexibly allocates the payload bits corresponding to the non-selected HARQ processes of the acknowledgment section of the current uplink control channel for other control information. For example, the uplink control channel configuration circuitry 446 may allocate the payload bits of non-selected HARQ processes in the acknowledgment information to other control information based on the other control information to be transmitted in the current uplink control channel, as shown and described above in reference to FIG. 4.

At block 1110, the scheduled entity further flexibly allocates payload bits of the control information section to other control information. For example, the uplink control channel configuration circuitry 446 may allocate the payload bits of the control information section to other control information based on the other control information to be transmitted in the current uplink control channel, as shown and described above in reference to FIG. 4.

At block 1112, the scheduled entity includes the acknowledgment information corresponding to the selected HARQ processes in the payload of the current uplink control channel based on the mapping. For example, the uplink control channel configuration circuitry 446 may configure the acknowledgment section of the uplink control channel structure for the current uplink control channel based on the selected HARQ processes and the mapping, as shown and described above in reference to FIG. 4. In addition, the HARQ process ID processing circuitry 448 may obtain the acknowledgment information (e.g., ACK or NACK) for each of the selected HARQ processes and provide the acknowledgment information to the UL traffic and control channel generation and transmission circuitry 442 for inclusion in the current uplink control channel based on the uplink control channel structure to be transmitted to the scheduling entity, as shown and described above in reference to FIG. 4.

At block 1114, the scheduled entity includes the other control information in the payload bits of the acknowledgment section and the control information section of the current uplink control channel based on the allocations made in blocks 1108 and 1111. For example, the uplink control channel configuration circuitry 446 may configure the uplink control channel structure for the current uplink control channel based on the allocations made in blocks 1108 and 1110 and provide the uplink control channel structure to the UL traffic and control channel generation and transmission circuitry 442. The UL traffic and control channel generation and transmission circuitry 442 may include the other control information in the payload of the current uplink control channel using the uplink control channel structure, as shown and described above in reference to FIG. 4. In some examples, the other control information may include beam quality information and/or channel quality information.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication at a user equipment (UE), comprising:
   one or more memories; and
   one or more processors coupled to the one or more memories, the one or more processors configured to:
      receive a downlink control channel comprising a request to transmit acknowledgment information corresponding to one or more selected segment indexes of a plurality of segment indexes on an uplink control channel, wherein each of the plurality of segment indexes references a respective segment of a plurality of segments associated with the uplink control channel, wherein each of the plurality of segments identifies a group of hybrid automatic repeat request (HARQ) processes of a plurality of HARQ processes; and
      transmit the uplink control channel comprising the acknowledgment information corresponding to the one or more selected segment indexes.

2. The UE apparatus of claim 1, wherein the uplink control channel further comprises other control information.

3. The apparatus of claim 2, wherein the other control information comprises one or more of beam information or channel quality information.

4. The apparatus of claim 2, wherein the other control information is based on one or more selected HARQ processes of the plurality of HARQ processes associated with the one or more selected segment indexes.

5. The UE apparatus of claim 2, wherein the one or more processors are further configured to:
   flexibly allocate one or more non-selected segments of the plurality of segments in the uplink control channel to the other control information.

6. The apparatus of claim 1, wherein each selected segment referenced by the one or more selected segment indexes comprises an equal number of bits of the acknowledgement information.

7. The apparatus of claim 1, wherein each selected segment referenced by the one or more selected segment indexes comprises a plurality of bits of the acknowledgement information.

8. The apparatus of claim 1, wherein the one or more processors are is further configured to:
   receive the downlink control channel comprising the request to transmit the acknowledgement information corresponding to each of the plurality of segment indexes on the uplink control channel.

9. The apparatus of claim 8, wherein the one or more processors are is further configured to:
   transmit the uplink control channel comprising the acknowledgement information corresponding to each of the plurality of segment indexes.

10. The apparatus of claim 1, wherein each of the plurality of segments includes payload bits mapped to the corresponding group of HARQ processes.

11. A method operable at a user equipment (UE), the method comprising:
   receiving a downlink control channel comprising a request to transmit acknowledgment information corresponding to one or more selected segment indexes of a plurality of segment indexes on an uplink control channel, each of the plurality of segment indexes referencing a respective segment of a plurality of segments associated with the uplink control channel, each of the plurality of segments identifying a group of HARQ processes of a plurality of HARQ processes; and transmitting the uplink control channel comprising the acknowledgment information corresponding to the one or more selected segment indexes.

12. The method of claim 11, wherein the uplink control channel further comprises other control information.

13. The method of claim 12, wherein the other control information comprises one or more of beam information or channel quality information.

14. The method of claim 12, wherein the other control information is based on one or more selected HARQ processes of the plurality of HARQ processes associated with the one or more selected segment indexes.

15. The method of claim 12, further comprising:
flexibly allocating one or more non-selected segments of the plurality of segments in the uplink control channel to the other control information.

16. The method of claim 11, wherein each selected segment referenced by the one or more selected segment indexes comprises an equal number of bits of the acknowledgement information.

17. The method of claim 11, wherein each selected segment referenced by the one or more selected segment indexes comprises a plurality of bits of the acknowledgement information.

18. The method of claim 11, wherein the receiving the downlink control channel further comprises:
receiving the downlink control channel comprising the request to transmit the acknowledgement information corresponding to each of the plurality of segment indexes on the uplink control channel.

19. The method of claim 18, wherein the transmitting the uplink control channel further comprises:
transmitting the uplink control channel comprising the acknowledgement information corresponding to each of the plurality of segment indexes.

20. The method of claim 11, wherein each of the plurality of segments includes payload bits mapped to the corresponding group of HARQ processes.

21. A user equipment (UE), comprising:
means for receiving a downlink control channel comprising a request to transmit acknowledgment information corresponding to one or more selected segment indexes of a plurality of segment indexes on an uplink control channel, wherein each of the plurality of segment indexes references a respective segment of a plurality of segments associated with the uplink control channel, wherein each of the plurality of segments identifies a group of HARQ processes of a plurality of HARQ processes; and
means for transmitting the uplink control channel comprising the acknowledgment information corresponding to the one or more selected segment indexes.

22. The UE of claim 21, wherein the uplink control channel further comprises other control information.

23. The UE of claim 22, wherein the other control information comprises one or more of beam information or channel quality information.

24. The UE of claim 22, wherein the other control information is based on one or more selected HARQ processes of the plurality of HARQ processes associated with the one or more selected segment indexes.

25. The UE of claim 22, further comprising:
means for flexibly allocating one or more non-selected segments of the plurality of segments in the uplink control channel to the other control information.

26. The UE of claim 21, wherein each selected segment referenced by the one or more selected segment indexes comprises an equal number of bits of the acknowledgement information.

27. The UE of claim 21, wherein each selected segment referenced by the one or more selected segment indexes comprises a plurality of bits of the acknowledgement information.

28. The UE of claim 21, wherein the means for receiving the downlink control channel further comprises:
means for receiving the downlink control channel comprising the request to transmit the acknowledgement information corresponding to each of the plurality of segment indexes on the uplink control channel.

29. The UE of claim 28, wherein the means for transmitting the uplink control channel further comprises:
means for transmitting the uplink control channel comprising the acknowledgement information corresponding to each of the plurality of segment indexes.

30. The UE of claim 21, wherein each of the plurality of segments includes payload bits mapped to the corresponding group of HARQ processes.

31. An apparatus for wireless communication at a network entity configured, comprising:
one or more memories; and
one or more processors coupled to the one or more memories, the one or more processors configured to:
select one or more selected segment indexes of a plurality of segment indexes for transmission on an uplink control channel, wherein each of the plurality of segment indexes references a respective segment of a plurality of segments associated with the uplink control channel, wherein each of the plurality of segments identifies a group of hybrid automatic repeat request (HARQ) processes of a plurality of HARQ processes;
transmit a downlink control channel comprising a request to transmit acknowledgment information corresponding to the one or more selected segment indexes on the uplink control channel; and
receive the uplink control channel comprising the acknowledgment information corresponding to the one or more selected segment indexes.

32. The apparatus of claim 31, wherein
the uplink control channel further comprises other control information.

33. The apparatus of claim 32, wherein the other control information comprises one or more of beam information or channel quality information.

34. The apparatus of claim 32, wherein the other control information is based on one or more selected HARQ processes of the plurality of HARQ processes associated with the one or more selected segment indexes.

35. The apparatus of claim 32, wherein the one or more processors are further configured to:
receive the other control information within one or more non-selected segments of the plurality of segments.

36. The apparatus of claim 31, wherein each selected segment referenced by the one or more selected segment indexes comprises a plurality of bits of the acknowledgement information.

37. The apparatus of claim 31, wherein the one or more processors are processor is further configured to:
    transmit the downlink control channel comprising the request to transmit the acknowledgement information corresponding to each of the plurality of segment indexes on the uplink control channel.

38. The apparatus of claim 37, wherein the one or more processors are further configured to:
    receive the uplink control channel comprising the acknowledgement information corresponding to each of the plurality of segment indexes.

39. The apparatus of claim 31, wherein each of the plurality of segments includes payload bits mapped to the corresponding group of HARQ processes.

40. A method operable at a network entity, the method comprising:
    selecting one or more selected segment indexes of a plurality of segment indexes for transmission on an uplink control channel, each of the plurality of segment indexes references a respective segment of a plurality of segments associated with the uplink control channel, wherein each of the plurality of segments identifies a group of hybrid automatic repeat request (HARQ) processes of a plurality of HARQ processes;
    transmitting a downlink control channel comprising a request to transmit acknowledgment information corresponding to the one or more selected segment indexes on the uplink control channel; and
    receiving the uplink control channel comprising the acknowledgment information corresponding to the one or more selected segment indexes.

41. The method of claim 40, wherein the
    uplink control channel further comprises other control information.

42. The method of claim 41, wherein the other control information comprises one or more of beam information or channel quality information.

43. The method of claim 41, wherein the other control information is based on one or more selected HARQ processes of the plurality of HARQ processes associated with the one or more selected segment indexes.

44. The network entity of claim 41, wherein the receiving the uplink control channel further comprises:
    receiving the other control information within one or more non-selected segments of the plurality of segments.

45. The method of claim 40, wherein each selected segment referenced by the one or more selected segment indexes comprises a plurality of bits of the acknowledgement information.

46. The method of claim 40, wherein the transmitting the downlink control channel further comprises:
    transmitting the downlink control channel comprising the request to transmit the acknowledgement information corresponding to each of the plurality of segment indexes on the uplink control channel.

47. The method of claim 46, wherein the receiving the uplink control channel further comprises:
    receiving the uplink control channel comprising the acknowledgement information corresponding to each of the plurality of segment indexes.

48. The method of claim 40, wherein each of the plurality of segments includes payload bits mapped to the corresponding group of HARQ processes.

49. A non-transitory computer-readable medium having stored therein instructions executable by one or more processors of a user equipment (UE) to:
    receive a downlink control channel comprising a request to transmit acknowledgment information corresponding to one or more selected segment indexes of a plurality of segment indexes on an uplink control channel, wherein each of the plurality of segment indexes references a respective segment of a plurality of segments associated with the uplink control channel, wherein each of the plurality of segments identifies a group of hybrid automatic repeat request (HARQ) processes of a plurality of HARQ processes; and
    transmit the uplink control channel comprising the acknowledgment information corresponding to the one or more selected segment indexes.

50. The non-transitory computer-readable medium of claim 49, wherein the uplink control channel further comprises other control information.

51. The non-transitory computer-readable medium of claim 50, wherein the other control information comprises one or more of beam information or channel quality information.

52. The non-transitory computer-readable medium of claim 50, wherein the other control information is based on one or more selected HARQ processes of the plurality of HARQ processes associated with the one or more selected segment indexes.

53. The non-transitory computer-readable medium of claim 49, wherein each selected segment referenced by the one or more selected segment indexes comprises an equal number of bits of the acknowledgement information.

54. The non-transitory computer-readable medium of claim 49, wherein each selected segment referenced by the one or more selected segment indexes comprises a plurality of bits of the acknowledgement information.

55. The non-transitory computer-readable medium of claim 49, further comprising instructions executable by the one or more processors of the UE to:
    receive the downlink control channel comprising the request to transmit the acknowledgement information corresponding to each of the plurality of segment indexes on the uplink control channel.

56. The non-transitory computer-readable medium of claim 55, further comprising instructions executable by the one or more processors of the UE to:
    transmit the uplink control channel comprising the acknowledgement information corresponding to each of the plurality of segment indexes.

57. The non-transitory computer-readable medium of claim 49, wherein each of the plurality of segments includes payload bits mapped to the corresponding group of HARQ processes.

58. A non-transitory computer-readable medium having stored therein instructions executable by one or more processors of a network entity to:
    select one or more selected segment indexes of a plurality of segment indexes for transmission on an uplink control channel, wherein each of the plurality of segment indexes references a respective segment of a plurality of segments associated with the uplink control channel, wherein each of the plurality of segments identifies a group of hybrid automatic repeat request (HARQ) processes of a plurality of HARQ processes;
    transmit a downlink control channel comprising a request to transmit acknowledgment information corresponding to the one or more selected segment indexes on the uplink control channel; and receive the uplink control channel comprising the acknowledgment information corresponding to the one or more selected segment indexes.

59. The non-transitory computer-readable medium of claim 58, wherein the uplink control channel further comprises other control information.

60. The non-transitory computer-readable medium of claim 59, wherein the other control information comprises one or more of beam information or channel quality information.

61. The non-transitory computer-readable medium of claim 59, wherein the other control information is based on one or more selected HARQ processes of the plurality of HARQ processes associated with the one or more selected segment indexes.

62. The non-transitory computer-readable medium of claim 58, wherein each selected segment referenced by the one or more selected segment indexes comprises a plurality of bits of the acknowledgement information.

63. The non-transitory computer-readable medium of claim 58 further comprising instructions executable by the one or more processors of the network entity to:
transmit the downlink control channel comprising the request to transmit the acknowledgement information corresponding to each of the plurality of segment indexes on the uplink control channel.

64. The non-transitory computer-readable medium of claim 63, further comprising instructions executable by the one or more processors of the network entity to:
receive the uplink control channel comprising the acknowledgement information corresponding to each of the plurality of segment indexes.

65. The non-transitory computer-readable medium of claim 58, wherein each of the plurality of segments includes payload bits mapped to the corresponding group of HARQ processes.

* * * * *